March 12, 1957  M. M. PLATZMAN  2,785,395
SPEED MONITOR
Filed March 22, 1952
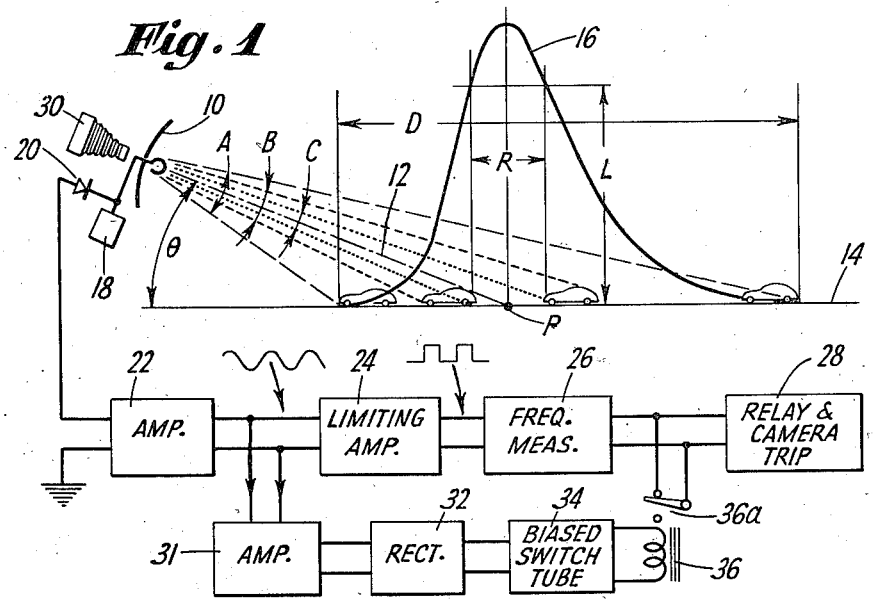
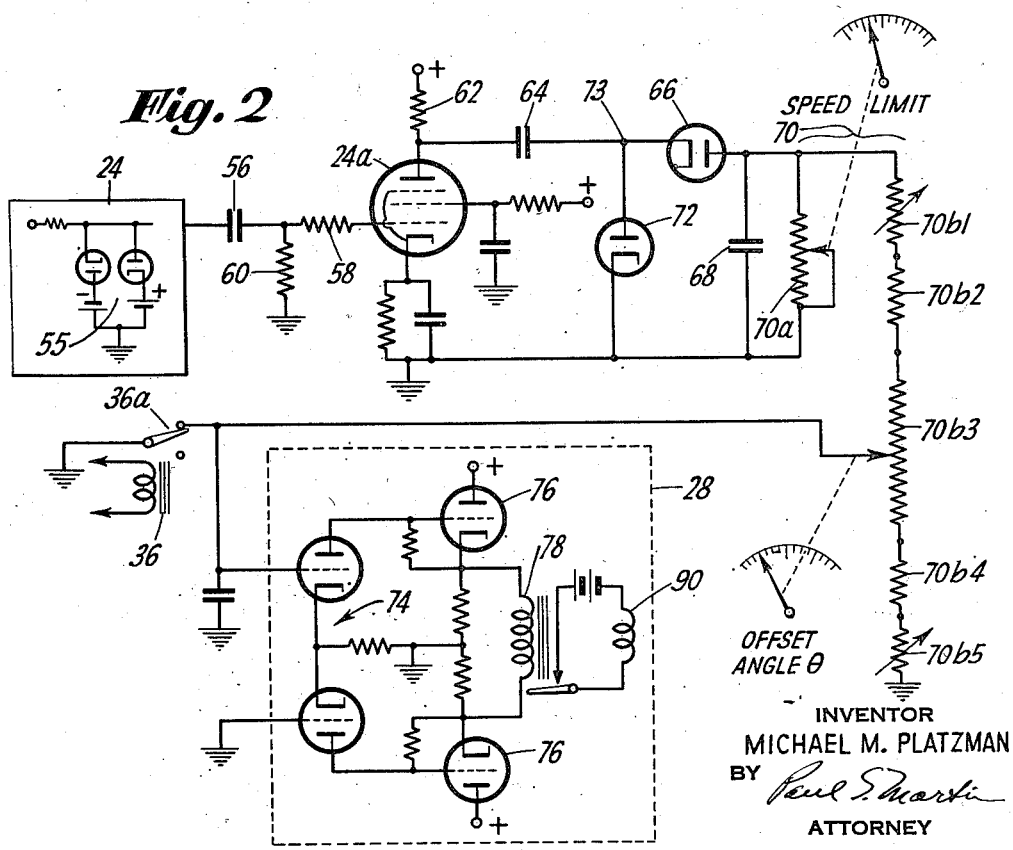
INVENTOR
MICHAEL M. PLATZMAN
BY
ATTORNEY

United States Patent Office 2,785,395
Patented Mar. 12, 1957

2,785,395

SPEED MONITOR

Michael M. Platzman, Brooklyn, N. Y., assignor, by mesne assignments, to Leon Pearle, doing business as Radar Control Devices Company, New York, N. Y.

Application March 22, 1952, Serial No. 277,938

5 Claims. (Cl. 343—8)

The present invention relates to apparatus and methods for measuring and for automatically evidencing speed.

The use of the Doppler effect produced when an object travels relative to a radio signal source has been applied to the measurement of object speeds. A radio beam is directed from a fixed antenna along the path of the object, the signal reflected from a moving object is mixed with a sample of the transmitted signal, and the resulting Doppler beat frequency signal is converted into terms of speed. This may be termed a "Doppler radar."

As applied to measurement of vehicular speed, the beam is directed slantwise toward approaching or departing traffic. Conversely, vehicles traveling along the traffic lane traverse the radar beam slantwise. The Doppler radar responds to reflected signals throughout the travel of a car's length into the beam, through the beam, and out of the beam.

An ideal traffic monitoring system can be imagined of a Doppler radar that responds to speeds above any arbitrary limit. A camera can be tripped by such radar in an automatic system for evidencing speeding. As a feature of the present invention, a camera is controlled by a Doppler radar in such arrangement as to preclude the possibility of false or ambiguous evidence of speeding. A feature of this invention is in the provision of a camera whose field from a certain vantage point is restricted so as to encompass little more than an average-sized vehicle, and in the provision of a Doppler radar at the same vantage point whose response range is limited to the camera field. In terms of distance along the traffic lane, the Doppler radar provided has an effective beam width limited to the normal separation between vehicles traveling at the speed limit for which the apparatus is adjusted, and limited to a fraction of the traffic lane width.

One problem in connection with the application of this concept arises from the fact that the beam width of the radar is effectively very great despite use of an antenna having what would ordinarily be considered a very narrow beam. A large aperture and high frequency are of limited effect in reducing the effective width of the beam in such apparatus because of the fact that the vehicle travels at a relatively small angle in relation to the beam in order to produce a Doppler signal. The vehicle travels not perpendicularly across the beam so as to have a short path through the beam but, instead, it travels slantwise at a small angle to the beam so as to have a long path through the beam. In this sense the effective beam width of even a narrow angle radar may be excessive. An object of the present invention is to provide apparatus and methods for measuring vehicular speed using Doppler effect radar where the particular region of speed measurement is confined within narrow limits. Viewed otherwise, an object of the invention is to provide a Doppler effect speed measuring system having an unusually narrow effective beam width.

Various electrical arrangements have been devised for the measurement of vehicular speed which are subject to serious objection arising from response of the apparatus to spurious signals. An object of the present invention is to substantially eliminate this difficulty.

In practice the installation of a Doppler speed measuring unit in relation to a vehicular travel lane presupposes the location of that unit at a point offset from the path of travel but angularly directed toward a point in the path of travel. The unit is either above the traffic lane or offside laterally or both, so as not to obstruct the traffic. The Doppler frequency is then found to be a function not only of the vehicular speed but also of the off-set angle. Accordingly, a further feature of this invention is in the provision of a Doppler frequency measuring circuit whose calibration is established for absolute values of direct-approach speed and, separately, for taking into account the angle between the beam and the line of travel.

The illustrative embodiment of the invention which is described in detail below accomplishes the foregoing objects and additional purposes as will become apparent. This illustrative apparatus employs a threshold suppressing circuit rendering input from the radar ineffectual for all signal levels below a pre-determined minimum and renders the apparatus fully effective when the signal level reaches or exceeds that minimum. This provision results in an extremely narrow effective beam width, and it has the further advantage of suppressing responses of the apparatus to spurious signals whose contribution to the main Doppler signal is a serious concern in the absence of such suppression circuit. This apparatus uses a rectifier and R-C timing circuit in combination with a limiting amplifier that converts the generally sine-wave Doppler signal to square waves. This has the advantage, among others, of virtually eliminating spurious signal contribution.

The form of frequency measurement apparatus described employs a further highly significant principle. This feature is concerned with critical response only to speeds above a pre-established limit. An adjustable resistance unit is included in a circuit which is effective to develop a fixed value of D. C. voltage at any particular Doppler frequency where this Doppler frequency corresponds to a speed of particular interest. A different resistance value is pre-set to develop this voltage for different "head-on" speed limits. In this circuit an adjustable angle-compensating resistor is provided, calibrated as a function of the angle between the radar beam and the object path which is effective for all the values of the absolute speed measuring resistance.

Further features and aspects of novelty will become apparent from the following detailed description of this illustrative embodiment which is shown in the accompaying drawings. In these drawings:

Figure 1 is a diagrammatic illustration of an entire illustrative embodiment of the invention; and Figure 2 is a specific illustrative embodiment of a portion of the wiring diagram of the system in Figure 1.

Referring now to Figure 1 a narrow beam directional antenna 10 is illustrated as having a central axis 12, directed toward a point P, in a roadway 14, which defines a path of travel of vehicles whose speed is to be measured. The antenna, in its operation, will radiate microwave energy, and will pick up and respond to reflected energy over a wide range of levels, the mixed generated and reflected signals will produce Doppler beat-frequency energy in the apparatus. This energy is represented by curve 16, whose ordinants vary as a function of the points along the path, being a maximum at point P and diminishing in both directions according to some complex function. Sufficient energy is realized throughout a distance D along roadway 14 to actuate the apparatus. It is of critical importance in producing photographic speeding evidence that the speed detection should be effected as close as possible to point P, invariably from each vehicle to the next. A range R of response along path 14 is established by including in the speed measuring system a threshold limiter whose effect is to suppress response of the system for signals up to a minimum pre-set level L. This provision has further advantages of great importance as will become apparent.

The beam width of the radar system, as a system, is presented by the angle A, which would be effective in the absence of any threshold limiter. Where the threshold limiter is employed a beam width B becomes the effective angle of the system as such. This is modified somewhat by a further consideration. If it were assumed that the angle B were 0° the system would, nonetheless, respond from the time a vehicle entered the beam to the time that the vehicle left the beam, so as to be effective for an angle represented by twice the length of the vehicle, taking into account the slant angle $\theta$ of the antenna. Viewed otherwise, the system has an effective angle C whose limits are the angle B, less the projected component across the beam of twice the length of the vehicle.

The radar system includes a microwave source of energy 18, advantageously a continuous wave klystron oscillator. Reflections from an object in the field of the antenna are collected by the antenna and suitably coupled to a silicon crystal detector 20 or the like. A directional coupler may be used to prevent the full intensity of the klystron oscillations from reaching the detector. A beat between the transmitted and the reflected signal will be produced where the reflecting object travels toward or away from the antenna 10, presuming the antenna to be stationary. The relative speed can be translated directly from the Doppler frequency where the object travels directly towards the antenna; and where the antenna is offset from path 14, either because of altitude or lateral offset or both, the speed corresponding to a given beat frequency and angle of offset can be computed.

The Doppler signal, which is ordinarily an audio frequency signal, is applied to amplifier 22 and in turn to limiting amplifier 24, then to a frequency measuring circuit 26 and to a utilization device which conveniently is a relay 28 and a mechanism for actuating a camera 30 that is installed with the antenna and trained on the travel lane. The field of the camera is that taken in by angle B, so that any vehicle entering or leaving range R will appear in any radar-tripped photograph. Range R is as small as practicable, in any event less than normal spacing between cars traveling at the speed limit.

In operation, the system described to this point produces a signal frequency depending upon the speed of the vehicle and the calibration of the system. The Doppler beat-frequency signal at detector 20 is very greatly amplified and limited so that the frequency measuring unit 26 will not be amplitude-sensitive but will only respond to the frequency of the Doppler signal. As a result, relay unit 28 would initially operate and would remain closed through a very long distance along lane 14, represented by angle A. Such result is virtually useless for automatic control of a camera to photograph a vehicle traveling at an excessive speed along a traffic lane and where the image of the car is to be used as evidence. One car might produce the actuating signal at a time when another is in the camera field.

In order to restrict the range along traffic lane 14 in which the system is to become effective, a threshold limiter is provided, including an amplifier 31 coupled to the input signal source, conveniently to the output of amplifier 22 as illustrated. The output of amplifier 31 is rectified in unit 32 and the direct-current output amplified in amplifier 34 and used in relay 36 having contacts 36a to disable the system at all times when the signal level is below a predetermined minimum L. When the signal level rises above level L, contacts 36a open and permit the signal from the frequency measuring unit 26 to be coupled to the utilization device 28. The connection of contacts 36a in the particular point shown is a matter of convenience. This may be connected alternatively at any point in the system following the point at which amplifier 30 has its input.

The signal level reaches and rises above the minimum required during travel of a vehicle along lane 14 only while at least part of the vehicle is in range R, which range can be made quite small. Unit 34 may be a vacuum tube biased to cut off, or biased to a current far too low to operate the relay, considering the relay characteristics. By this arrangement, it is certain that the vehicle which actuated the system is identically the same vehicle that later appears in the developed photograph. The possibility that the camera might photograph a slow-moving vehicle under control of a speeding vehicle is avoided and while the energy in the radar beam might actually be spread over a wide angle, the operation of unit 28 is confined to a small range near P.

The signal obtained from rectifier 20 is likely to contain "noise" developed by the system itself and other spurious signal components such as may be due to a vibrating portion of the vehicle, or to weak signals coming from fringe regions in the antenna pattern. It is desired to have the system respond only to the bulk of the signal and not to spurious signal components. Significantly the suppressor 36a renders the system responsive to the whole signal during the range of travel R when the system is responsive at all. The spurious signal components at that time have but a negligible effect on the response of the system, as will be seen, and the system is controlled by the strong signal attributable to the vehicle in the camera range. The particular form of frequency measuring apparatus employed with the limiter 24 is important in achieving this result, the virtual elimination of spurious signal contribution.

The limiting amplifier is operated at constant output voltage for Doppler signals of a certain minimum input level, this amplifier advantageously including a fixed bias clipper 55. In Figure 2, limiting amplifier 24 is seen to have a final limiting amplifier stage 24a whose input coupling circuit includes a coupling condenser 56 and a resistor 58 connected to the grid of stage 24a and having a grid return resistor 60. The anode load resistor 62 of stage 24a forms part of the limiting amplifier; and it also forms part of the frequency measuring network. The limiting amplifier produces square wave output which virtually eliminates higher and lower frequency constituents of the input signals, where those constituents are of small amplitude relative to the main Doppler signal.

The frequency measuring system employed in connection with this limiting amplifier includes series condenser 64 and series diode 66, and a shunt condenser 68 and a resistance network 70 in parallel with condenser 68. One side of condenser 68 is grounded as is network 70 and the negative return of amplifier stage 24a that constitutes a discharge path for condenser 64. A shunt diode 72 is connected between ground and point 73 between condenser 64 and diode 66. Diodes 66 and 72 are polarized so as to be conducting during opposite excursions of the square wave produced at the anode of amplifier 24a. The condensers 64 and 68 are relatively small and the resistor 62 and network 70 are chosen in relation to those condensers so that approximately linear D. C. voltage variation will be available across condenser 68 as a function of output frequency. The direct current output of the frequency measuring circuit is directly coupled to any convenient form of relay energizing network, advantageously including a cathode phase inverter amplifier 74 whose unbalanced output is direct-coupled to triode sections 76 having their cathodes connected for energizing relay 78 and thereby energize camera tripping solenoid 90.

The camera tripping network remains unresponsive to the voltage produced across condenser 68, except when that voltage reaches a critical value. For speeds producing low frequency Doppler signals, the time constant circuit 68, 70 is such that insufficient rectified voltage is produced for energizing the output circuit. For higher frequencies the output circuit is energized and the camera is activated to photograph a vehicle in angle B that may exceed the set speed limit.

The rate of variation of the voltage across condenser 68, plotted against frequency is steepest for only a certain range of resistances presented by network 70. It has accordingly been found advantageous to use an adjustable resistor 70a calibrated to have a time constant with condenser 68 that is substantially the optimum for a specific frequency in the range of frequencies to be measured. The calibration points on resistor 70a are so chosen as to yield the same voltage developed across condenser 68 for each of a series of points in the whole range of frequencies, corresponding to a range of speed limits.

With the circuit shown, the voltage for the selected frequency points determining the values of resistor 70a is made constant, and the combination of the R and C values in the network, once calibrated, will also be a constant.

The RC constants of the frequency measuring network as determined in particular by the setting of resistor 70a that is selected are chosen to represent the head-on condition of coincidence between the radar beam and the traffic lane. Where there is an angle θ between the radar beam and the object path, a correction is necessary in order to adapt the Doppler frequency measurement to the practical installation requirements.

To adapt the frequency measuring network to take the angle θ into account, there is provided a series of resistors 70b, including 70b1, 70b2, 70b3, 70b4 and 70b5. Resistors 70b are connected in series with each other, this series resistor circuit being connected in parallel with condenser 68 and resistor 70a. The aggregate value of resistors 70b is made of a higher order of magnitude than the maximum resistance of any unit 70a. Series resistor circuit 70b constitutes a voltage divider so that some fraction of the direct-current voltage developed across the condenser 68 can be used for output control purposes. Only small percentage of the voltage developed across condenser 68 is used for the tripping of circuit 28 to correspond to the condition of coincidence between the line of travel and the radar beam. A greater percentage of this value of voltage is used where some finite value of the angle θ must be taken into account. Resistor 70b3 is advantageously formed as a helical potentiometer that can be accurately set to any value over a wide calibrated range of adjustment for this purpose. Additional resistors 70b1 and 70b2 higher in potential than 70b3 and additional resistors 70b4 and 70b5, lower in potential than resistor 70b3 are here used to adjust and extend the calibration of resistor 70b3 over the full practical range of angles θ that are required. Resistors 70b1 and 70b5 are adjustable resistors to facilitate refined determination of the calibration range of resistor 70b3 to take into account the desired practical range of offset angles θ.

An illustrative set of values in the frequency measuring circuit are as follows: resistor 70a, 150,000 ohms adjustable to 40,000 ohms; resistor 62, 47,000 ohms; resistors 70b1, 70b2, 70b3, 70b4 and 70b5 of resistances 2,500 ohms, 9,500 ohms, 100,000 ohms, 60,000 ohms and 250,000 ohms respectively; and condensers 64 and 68 of 580 micromicrofarads each.

With the foregoing range of values, the apparatus can be adjusted for frequencies corresponding to speed limits of 15 to 60 miles per hour and for angles θ from 10 degrees to 35 degrees for each speed limit selected.

The Doppler frequency is a combination not only of the speed of the vehicles and the angles as indicated above, but is also a function of the microwave operating frequency. In designing the frequency measuring network the illustrative values above will be subject to variation by the designer, the values listed being proportioned for an operating frequency of a microwave source 18 of 25,000 megacycles per second.

The form of rectifier and R-C network described is highly effective for square-wave frequency measurement. However, various substitutions such as grid controlled rectifying analogues will be evident to those skilled in the art. These frequency measuring units or discriminators respond to the frequency of the limited signal, not to modulation thereof, and have a time-constant of the same order of magnitude as the Doppler frequency. These units cooperate with the limiting amplifier and respond critically to the frequency of the square waves independently of spurious signal contribution to the input signal which includes the primary strong Doppler signal combined with "noise" and a variety of weak spurious Doppler signals. It will be appreciated that antenna 10 should have as narrow a beam as possible despite the "beam-narrowing" channel 31, 32, 34, 36, 36a, in order that the signal contribution from vehicles outside range R but in range D may be weak compared to the signal from a vehicle in range R.

It has been found in practice that the apparatus is effective to distinguish between vehicle speeds within the limits of accuracy of automobile speedometers despite wide range of temperature conditions and over a long period of time. The apparatus is highly stable and will defy rigorous tests that have produced false response from broadly comparable Doppler measuring devices. Thus, for example, where chains were dragged behind a vehicle proceeding slowly a known Doppler speed-detector would register as if it were a high speed vehicle, whereas the system here described is utterly immune to this type of spurious signal source.

Resistor 70a is adjustable stepwise or continuously according to speed limits at which unit 28 will trip the camera, where potentiometer 70b3 remains set at a low point corresponding to a small angle θ. The calibration of resistor 70a is established on the basis of developing a certain camera-tripping voltage. For one setting of resistor 70a, the potentiometer is set so as to develop that tripping voltage for a certain vehicular speed over the full range of off-set angles θ. It is then found that the calibration of potentiometer 70b3 holds its accuracy for the whole range of settings of resistance unit 70a.

A number of features of the invention have been pointed out as significant or as important; and while these represent valuable aspects of the invention, the broader concepts involved herein are susceptible of use separately; and to those skilled in the art further modification and application of the features of novelty will be readily apparent. Consequently the appended claims should be accorded that broad latitude of interpretation which is consistent with the spirit and scope of the invention.

What I claim is:

1. A Doppler excess-speed detecting system including a narrow beam directional antenna, a signal generator coupled to said antenna for providing a signal that is transmitted and returned in part by a reflecting object, a mixer for combining said generated and reflected signals and thereby providing a Doppler beat signal, a limiting amplifier coupled to said mixer for converting the mixer output to square waves of predetermined constant amplitude upon reception of signals exceeding a predetermined minimum of mixer output, a frequency measuring device having a rectifier and a resistance-capacitance load whose time constant is of the same order of magnitude as the period of the Doppler signal of minimum frequency to which the system is to respond, said resistance-capacitance load including a variable resistor calibrated in miles per hour at which the system is to respond and in parallel therewith a potentiometer calibrated in off-set angle between the direction of the antenna and the path of the object whose speed is to be measured, and an object identifying device coupled to the adjustable contact of said potentiometer and operative upon development of a predetermined minimum output to identify the reflecting object.

2. A radio detection and ranging system having a transmitter, receiver and object identifying device and including an antenna having a normal beam width substantially greater than the normal width than the object identified, said transmitter and receiver being effective to produce Doppler signals of sufficient strength for normal response at the object identifying device, and a threshold limiting device comprising a sequentially-coupled signal amplifying device, a rectifier and a biased switch tube adapted to produce a variable amplitude signal output functioning as an electronic gate to control a second channel, said second channel comprising a mixer for combining transmitted and reflected signal components to produce the Doppler signal, and means responsive to certain Doppler signal frequencies and controlled by said electronic gate to actuate said object identifying device to identify the object passing through the antenna beam.

3. A radio detection and ranging system having a transmitter, receiver and object identifying device and, including an antenna having a normal beam width substantially greater than the normal width than the object identified, said transmitter and receiver being effective to produce Doppler signals of sufficient strength for normal response at the object identifying device, and a threshold limiting device comprising a sequentially coupled signal amplifying device, rectifier and biased switch tube adapted to produce a variable amplitude signal output functioning as an electronic gate to control a second channel, said second channel comprising a mixer for combining transmitted and reflected signal components to produce the Doppler signal, means responsive to certain Doppler signal frequencies and controlled by said electronic gate to actuate said object identifying device to identify the object passing through the antenna beam, and said second channel being operative to suppress a signal of less intensity when a concurrent signal of higher intensity is simultaneously received.

4. A radio detection and ranging system having a transmitter, receiver and object identifying device and, including an antenna having a normal beam width substantially greater than the normal width than the object identified, said transmitter and receiver being effective to produce Doppler signals of sufficient strength for normal response at the object identifying device, and a threshold limiting device comprising a sequentially coupled signal amplifying device, rectifier and biased switch tube adapted to produce a variable amplitude signal output functioning as an electronic gate to control a second channel, said second channel comprising a mixer for combining transmitted and reflected signal components to produce the Doppler signal, means responsive to certain Doppler signal frequencies and controlled by said electronic gate to actuate said object identifying device to identify the object passing through the antenna beam, and said electronic gate being operatively responsive only to Doppler signals having a predetermined signal strength wherein objects reflecting signals of such low magnitude as below said predetermined signal strength will not actuate said electronic gate.

5. A radio detection and ranging system including a directional antenna having a normal beam encompassing a considerable portion of a vehicular travel lane, Doppler signal deriving means coupled to said antenna, a frequency measuring channel energized by said Doppler signal means and including a square-wave limiter and a frequency measuring unit, an object identifying device adapted to be energized by said frequency measuring unit, said frequency measuring channel being adapted to control said object identifying device only when the Doppler signal received by said antenna exceeds a predetermined signal strength, a second channel comprising a threshold suppressor adapted to be controlled by said Doppler signal means and cooperable with said first channel to control said object identifying device when the Doppler signals received are of the minimum predetermined strength.

References Cited in the file of this patent

UNITED STATES PATENTS

| | | |
|---|---|---|
| 2,347,194 | Holliday | Apr. 25, 1944 |
| 2,477,567 | Barker | Aug. 2, 1949 |
| 2,540,089 | Barker | Feb. 6, 1951 |
| 2,620,470 | Rather et al. | Dec. 2, 1952 |

FOREIGN PATENTS

| | | |
|---|---|---|
| 656,394 | Great Britain | Aug. 22, 1951 |